(12) United States Patent
Giovannini et al.

(10) Patent No.: US 6,729,802 B2
(45) Date of Patent: May 4, 2004

(54) SYSTEM AND METHOD FOR ABANDONING AND RECOVERING PIPELINE

(75) Inventors: Umberto Giovannini, Buccinasco (IT); Vincenzo Penzo, Venezia (IT)

(73) Assignee: Saipem, S.p.A., Milan (IT)

( * ) Notice: Subject to any disclaimer, the term of this patent is extended or adjusted under 35 U.S.C. 154(b) by 0 days.

(21) Appl. No.: 10/168,566

(22) PCT Filed: Dec. 21, 2000

(86) PCT No.: PCT/EP01/13095

§ 371 (c)(1),
(2), (4) Date: Aug. 27, 2002

(87) PCT Pub. No.: WO01/48410

PCT Pub. Date: Jul. 5, 2001

(65) Prior Publication Data

US 2003/0099515 A1 May 29, 2003

(30) Foreign Application Priority Data

Dec. 23, 1999 (GB) ................................................ 9930492

(51) Int. Cl.⁷ .............................. F16L 1/00; F16L 1/12; F16L 55/00
(52) U.S. Cl. .................... 405/158; 405/154.1; 405/166; 405/173; 138/93; 285/24
(58) Field of Search .............. 405/154.1, 155, 405/158, 162, 166, 167, 168.1–4, 170–173, 190; 138/89, 93; 285/18, 24, 305, 308; 294/66.1, 94–96; 114/267

(56) References Cited

U.S. PATENT DOCUMENTS 3,724,061 A * 4/1973 Schipper ..................... 405/169
3,751,932 A * 8/1973 Matthews, Jr. ............... 138/93
3,756,034 A * 9/1973 Lochridge et al. .......... 114/267
3,777,499 A * 12/1973 Matthews, Jr. .............. 405/173

(List continued on next page.)

FOREIGN PATENT DOCUMENTS

| GB | 1 460 493 | | 1/1977 |
|---|---|---|---|
| GB | 2036917 | * | 7/1980 |
| GB | 2 126 312 A | | 3/1984 |
| GB | 2 286 648 A | | 8/1995 |
| GB | 2 310 269 A | | 8/1997 |
| GB | 2 313 896 A | | 12/1997 |
| GB | 2 316 147 A | | 2/1998 |
| GB | 2 321 290 A | | 7/1998 |
| WO | 95/22484 | | 8/1995 |

OTHER PUBLICATIONS

Robert T. Gilchrist Jr., "Here are Design Procedures for Installing Deepwater Plem", XP–000833530, pp. 63–64, 66–68, 70–71, Feb. 11, 1998, Deepwater Technology, Second–End Plem Installation Phases.

Primary Examiner—Jong-Suk (James) Lee
(74) Attorney, Agent, or Firm—Burns, Doane, Swecker & Mathis, L.L.P.

(57) ABSTRACT

A method of abandoning a pipeline (2) being laid by a vessel having an A/R system, wherein a sealine (2, 11, 13) is initially held by a pipe laying and tensioning arrangement. The method includes a step of reducing tension at sea level of the sealine (2, 11, 13), by connecting one or more buoyant members (13) to the end of the pipeline (2). The members (13) are then lowered into the sea, using a line (16). At least one member (13) is connected to the pipeline (2) through a connection (12) which allows pivoting of the member (13) so that the end of the member (13) at the end of the pipeline (2) projects upwardly from the seabed (3).

45 Claims, 8 Drawing Sheets

U.S. PATENT DOCUMENTS

| | | | |
|---|---|---|---|
| 3,835,656 A | * 9/1974 | McDermott | 405/170 |
| 3,842,612 A | * 10/1974 | Arnold | 405/173 |
| 3,971,228 A | * 7/1976 | Silvestri et al. | 405/173 |
| 4,011,620 A | * 3/1977 | Southgate | 138/89 |
| 4,051,687 A | * 10/1977 | Ells | 405/173 |
| 4,051,688 A | * 10/1977 | Ells et al. | 405/170 |
| 4,063,430 A | 12/1977 | Lamy | |
| 4,080,799 A | * 3/1978 | Nanny | 138/93 |
| 4,127,006 A | * 11/1978 | Oosterkamp | 405/171 |
| 4,145,909 A | 3/1979 | Daughtry | |
| 4,155,669 A | * 5/1979 | Rochelle | 405/158 |
| 4,332,510 A | * 6/1982 | Ferrentino | 294/66.1 |
| 4,493,590 A | * 1/1985 | Ayers et al. | 405/173 |
| 4,547,163 A | * 10/1985 | Langpaap et al. | 441/2 |
| 4,687,378 A | 8/1987 | Jegousse et al. | |
| 5,188,483 A | * 2/1993 | Kopp et al. | 405/158 |
| 5,190,107 A | * 3/1993 | Langner et al. | 405/209 |
| 5,449,252 A | 9/1995 | Maloberti et al. | |
| 5,573,353 A | 11/1996 | Recalde | |
| 5,718,538 A | 2/1998 | Recalde | |
| 5,921,713 A | * 7/1999 | Gjessing et al. | 405/170 |

\* cited by examiner

SYSTEM AND METHOD FOR ABANDONING AND RECOVERING PIPELINE

BACKGROUND OF THE INVENTION

This invention relates generally to the laying of pipelines and in particular to a method for abandoning (or abandoning and recovering) a pipeline. The invention also relates to a system for use in such a method. Such a system and such a method are referred to herein as an A/R system and an A/R method.

During laying, it is sometimes necessary to abandon a pipeline and recover it later. For example, a pipeline might need to be abandoned because of severe weather conditions or mechanical problems aboard the laying vessel.

Conventionally, such abandonment and recovery is carried out by a method such as: welding an abandonment/recovery head onto the end of the pipeline being laid; connecting a steel rope to the head; transferring pipeline tension from the pipeline tensioning arrangement on the laying vessel that is used during normal laying to a winch on the vessel; and laying the pipeline and head on the sea bed. In severe weather conditions the vessel may also have to disconnect the rope from the winch and abandon the rope for later recovery; the end of the rope may then be marked by a buoy connected to it directly or via a pennant line.

Use of a conventional A/R system in deep water causes several problems.

The steel rope associated with the winch must have a very high tensile strength to support the high load resulting from the long length of pipeline, which initially extends from the seabed to the vessel. That requires a steel rope having a larger diameter, which, in turn, increases its weight. A higher load capacity is then required of the winch. The problem is increased because a very long steel rope and a very long pennant line are required, which creates further weight. The factors just described mean that the provision of a conventionally designed A/R system on a vessel able to operate in deep water is unduly expensive.

OBJECTS AND SUMMARY

The effect of the factors referred to above is to make the provision of an effective and economical A/R system problematic when pipelines are being laid in deep water.

It is an object of the invention to provide a method and apparatus of laying a pipeline which overcomes or mitigates the above-mentioned problem.

According to a first aspect of the present invention there is provided a method of abandoning a pipeline being laid by a vessel, including the steps of reducing the tension at sea level of the sealine being laid by the vessel, and thereafter lowering the end of the sealine towards the seabed using a line from a winch on the vessel. Preferably, the tension is reduced by at least 15%. Advantageously, the tension is reduced by at least 30%, and more preferably by at least 40%.

By reducing the tension at sea level of the sealine being laid by the vessel before the winch is used to lower the sealine, it becomes possible to employ a winch whose maximum load bearing capacity is substantially less than the maximum tension under which the vessel is designed to lay the pipeline (the tension when the pipeline is being laid at the greatest depth). The maximum load bearing capacity of the winch may therefore be less than the maximum load bearing capacity of the pipe laying and tensioning arrangement that is used for laying the pipeline. Similarly the load bearing capacity of the winch line can be reduced thereby enabling its diameter to be reduced. In an example of the invention the load bearing capacity of the winch is reduced to about 50% of the maximum tension under which the vessel is designed to lay a pipeline. A reduction in the load bearing capacity (SWL) of the winch is critical in enabling an effective and economical A/R system to be provided even on a vessel designed to be capable of laying large diameter pipelines in deep water.

Where reference is made in the specification to a "sealine" it should be understood that the term is referring to the pipeline laid on the seabed together with any pipeline or other elongate members extending upwardly from the pipeline.

In embodiments of the invention described below, the step of reducing the tension at sea level of the sealine being laid by the vessel comprises connecting one or more light elongate members to the end of the pipeline and lowering the elongate members into the sea. Where reference is made to a "light" elongate member, it should be understood that the member is to be light per unit length, when submerged in water, by comparison with the weight in water of the pipeline to which it is connected, so that the effect of connecting the light elongate member in the sealine is to reduce the weight of the sealine. It will be appreciated that any reduction in weight of the sealine extending between the vessel and the seabed will reduce the tension in the sealine at sea level. In the case where the pipeline is flooded, connection of a further length of pipeline sealed at both ends to prevent flooding represents connection of a light elongate member and reduces the tension in the sealine. Provided the water in which the method is carried out is not too deep, the use of such sealed pipeline or similar members may alone reduce the tension to a level that the winch is able to bear. In deeper water, however, even when the pipeline is not flooded, the tension in the pipeline may be too great for the winch to bear; in this case connecting a length of sealed pipeline will not reduce the tension and a lighter member is required to be connected; preferably such a member is sufficiently light that it is buoyant and, more preferably, generates an upward buoyancy force in water of the order of one half its weight in air or more. In especially deep water it may be desirable to connect together a series of buoyant members.

Said at least one buoyant elongate member may be composed principally of a lightweight material, for example, one selected from the group comprising glass fibre reinforced resins, other composite materials, carbon, titanium and aluminium. In an embodiment of the invention described below the material is a glass fibre reinforced vinyl ester resin. Parts of the elongate member, for example, end fittings, may be made of heavier material, for example, steel.

An intermediate elongate member is preferably connected between the end of the pipeline and a buoyant elongate member. The intermediate elongate member is preferably hollow and sealed against the ingress of water. The intermediate elongate member may be of sufficient weight not to be buoyant when empty. Preferably the member is provided with a valve to enable the interior of the intermediate elongate member to be flooded by sea water. Especially in the event that the sealine cannot be recovered by connecting a winch line to its end, the method may further include the step of cutting the intermediate elongate member, connecting the winch line to the end of the elongate member that is connected to the pipeline and recovering the end of the pipeline. The ability to flood the interior of the intermediate elongate member enables pressures to be equalised, thereby facilitating the cutting of the member.

When the one or more elongate members first begin to be lowered into the sea the tension that has to be applied to them is substantially the same as when laying pipe. It is a much preferred feature of the invention that the one or more elongate members are lowered using a pipe laying and tensioning arrangement on the vessel that is used for laying the pipeline; usually there is only one such tensioning arrangement although it may have several component parts. In order to facilitate use of the same tensioning arrangement, it is preferred that the diameter of the light elongate members is substantially the same as the diameter of the ordinary lengths of pipe making up the pipeline. Indeed the light elongate members are preferably of the same general dimensions as an ordinary length of pipe. As will now be understood, the invention enables the load bearing capacity of the winch to be substantially less than the load bearing capacity of the tensioning arrangement.

In some cases there will be no need to disconnect the winch line from the sealine because the laying vessel is able to remain at its station, connected via the winch line to the pipeline. In other cases, however, it will be desirable for the vessel to become completely freed and the method of the invention therefore preferably includes the subsequent step of disconnecting the sealine from the winch line. The disconnection can be effected in a variety of ways. A first possibility, if an ROV is provided as would normally be the case, is for the disconnection of the sealine from the winch line to be initiated by a physical contact of the ROV with a connector connecting the sealine to the winch line. It is also possible for disconnection to be initiated remotely in other ways, for example by a signal transmitted from an ROV or the vessel; the signal may be an acoustic signal. In that case the disconnection can be effected without the need for any physical interaction with an ROV or any other outside agency. In one advantageous embodiment of the invention the disconnection takes place automatically at a predetermined angle of the adjoining ends of the winch line and the sealine attached thereto. That predetermined angle is preferably in the range of 45° to 75° and in an embodiment of the invention is about 60°.

Even in a case where the disconnection is initiated by physical contact from the ROV, it is preferable that the physical contact amounts merely to a signal and that disconnection is able to take place with little or no intervention by the ROV or any other physical manipulation. Preferably the energy required for disconnection is stored in the connecting arrangement.

Preferably said at least one elongate member is connected to the pipeline through a connection which allows pivoting of the elongate member about a horizontal axis when the pipeline is lying horizontally. Such an arrangement also makes it easier to adopt the preferred method in which, after disconnection of the sealine from the winch line, an end portion of the sealine projects upwards from the seabed.

Thus, according to a second aspect of the invention, there is provided a method of abandoning a pipeline being laid by a vessel, including the steps of connecting one or more buoyant elongate members to the end of the pipeline, thereafter lowering the elongate members into the sea and then abandoning the pipeline, wherein one or more elongate members are so connected to the pipeline that the end of the elongate member at the end of the pipeline projects upwardly from the seabed, thereby facilitating the future recovery of the pipeline. Preferably, at least one elongate member is connected to the pipeline through a connection which allows pivoting of the elongate member about a horizontal axis when the pipeline is lying horizontally. Preferably, there is also a step in which the abandoned pipeline is recovered, for example, as described below with reference to the method according to the first aspect of the invention.

The method of the first aspect of the invention also preferably provides for recovery of the pipeline after abandonment. Thus the method preferably further includes recovering the abandoned pipeline by carrying out the further steps of raising the end of the sealine to the vessel using the winch, and raising the sealine further using a pipe laying and tensioning arrangement on the vessel that is used for laying the pipeline. As will be appreciated, in a case where the method includes disconnection of the winch line from the sealine, it is preferred that the further steps also include a preliminary step of connecting the winch line to the sealine.

The invention further provides an A/R system for carrying out a method of abandoning a pipeline as defined above with reference to either the first or second aspects of the invention. Such a system preferably includes a winch, a winch line and one or more light elongate members. Preferably the system includes one or more buoyant elongate members.

The A/R system preferably includes a connector for connecting the winch line releasably to the one or more buoyant elongate members. The connector preferably includes a stored energy arrangement for providing energy to actuate the release of the winch line from the one or more elongate members. The stored energy arrangement may take various forms including an electrical battery but preferably the energy is stored as pressurised hydraulic fluid in an accumulator and preferably the release of the winch line is hydraulically actuated. The hydraulic actuation may serve to extend or retract radially extending parts of a male element fitted inside a female element and unable to disengage when the parts are extended.

A joint may be provided for connecting the one or more buoyant elongate members to a pipeline. The joint preferably allows pivotal movement of the one or more buoyant elongate members about an axis transverse to the longitudinal axis of the end of the pipeline. Furthermore the joint preferably also allows pivoting of the one or more buoyant elongate members about the longitudinal axis of the end of the pipeline. By allowing such pivoting it becomes possible to arrange for the one or more buoyant elongate members to pivot upwardly from the part of the sealine resting on the seabed and therefore to enable a connection between the winch line and the buoyant members to be well clear of the seabed.

The invention still further provides a pipe laying vessel including an A/R system as defined in any of the paragraphs above. The vessel preferably includes a tensioning arrangement for withstanding the tension exerted by a pipeline during laying and a winch for use when abandoning the pipeline during laying, wherein the safe working load of the winch is lower than the safe working load of the tensioning arrangement.

The invention also provides a pipe laying vessel including an A/R system and comprising:
  a tensioning arrangement for withstanding the tension exerted by a pipeline during laying,
  a winch and a winch line,
  wherein the safe working load of the winch is lower than the safe working load of the tensioning arrangement.

Such a vessel may have any of the features referred to in the paragraphs above.

With a conventional winch system it would be undesirable to provide an abandonment/recovery system that was unable to cope in all the conditions that might be encountered because the SWL of the winch was not great enough. In the present invention, however, that reasoning is disregarded and a novel approach adopted.

The method and system employed in the preferred embodiments of the invention for disconnecting the winch line from the sealine is itself novel and may be applied in other situations apart from those referred to above. Thus according to a third aspect of the invention there is provided a method for disconnecting a winch line from a pipeline, the method including the steps of:

connecting a first part of a connector to the pipeline, providing a second part of the connector on the winch line, the first and second parts being able to mate with one another and being provided with a locking/unlocking arrangement that can be remotely actuated, mating the first and second parts of the connector and locking them together, and when the first and second parts of the connector are underwater, remotely actuating the locking/unlocking arrangement to unlock the parts and thereafter disconnecting the parts.

Also according to the third aspect of the invention there is provided a disconnection system for disconnecting a winch line from a pipeline, the system comprising: a first part of a connector, the first part being connectable to a pipeline; and a second part of the connector, the second part being connectable to a winch line; the first and second parts being able to be connected and locked together by a locking mechanism and being able to be unlocked when underwater by remote actuation of the locking mechanism.

The method and system according to the third aspect of the invention may, except where inappropriate, include any of the features referred to above with respect to the first and second aspects of the invention. For example, the remote actuation may be automatic at a certain angle, may be initiated by a physical contact by an ROV or may be initiated by an acoustic signal. In an embodiment of the invention described below, the first and second parts of the connector include a male part and a female part, the male part being accommodated by the female part when the first and second parts are connected. In that embodiment, the first part forms the female part and the second part forms the male part (although it will be appreciated that the first part could be the male part and the second part could be the female part). Thus a significant proportion of one of the first and second parts may be inserted into and accommodated by the other. In particular, in the case where a stored energy arrangement is provided, it is preferred that that arrangement be housed in a section of one of the first and second parts that is, when the parts are connected, accommodated by the other of the parts, thereby enabling the disconnection system to be compact. The disconnection system preferably comprises a plurality of radially movable locking members being movable to and from positions in which the members lock the first and second parts together. The locking members may for example be moved, in use, by axial movement of a camming surface.

BRIEF DESCRIPTION OF THE DRAWINGS

Embodiments of the invention will now be described, by way of example, with reference to the drawings, of which:

FIG. 8b is a sectional view along the lines b—b in FIG. 8a;

DETAILED DESCRIPTION OF THE PREFERRED EMBODIMENTS

Figure 1:
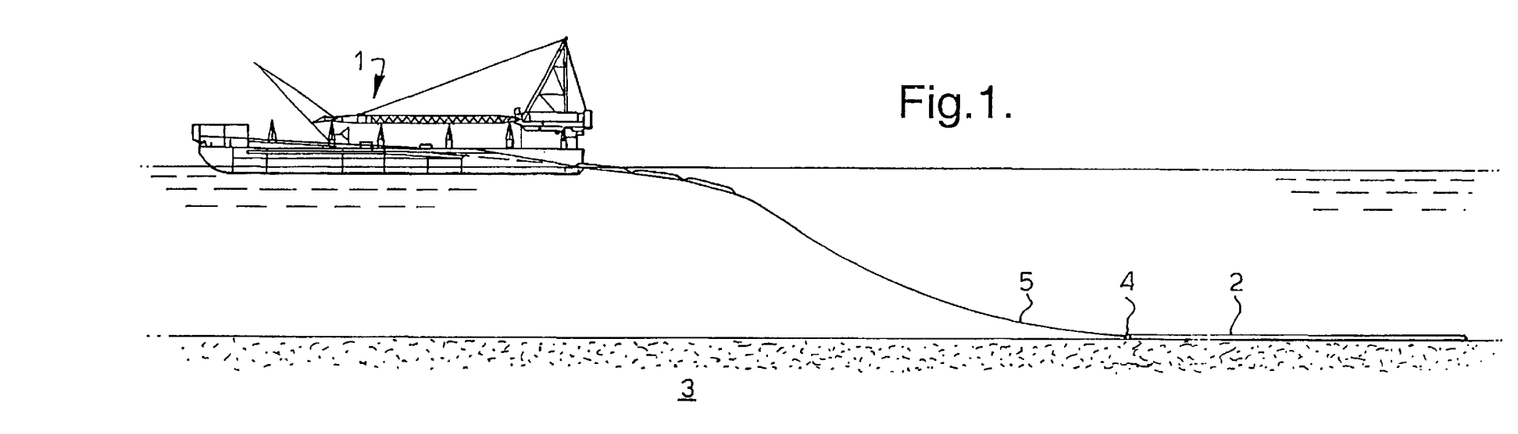
FIG. 1 shows an S-lay vessel abandoning a pipeline in shallow waters according to the prior art.
Figure 2:
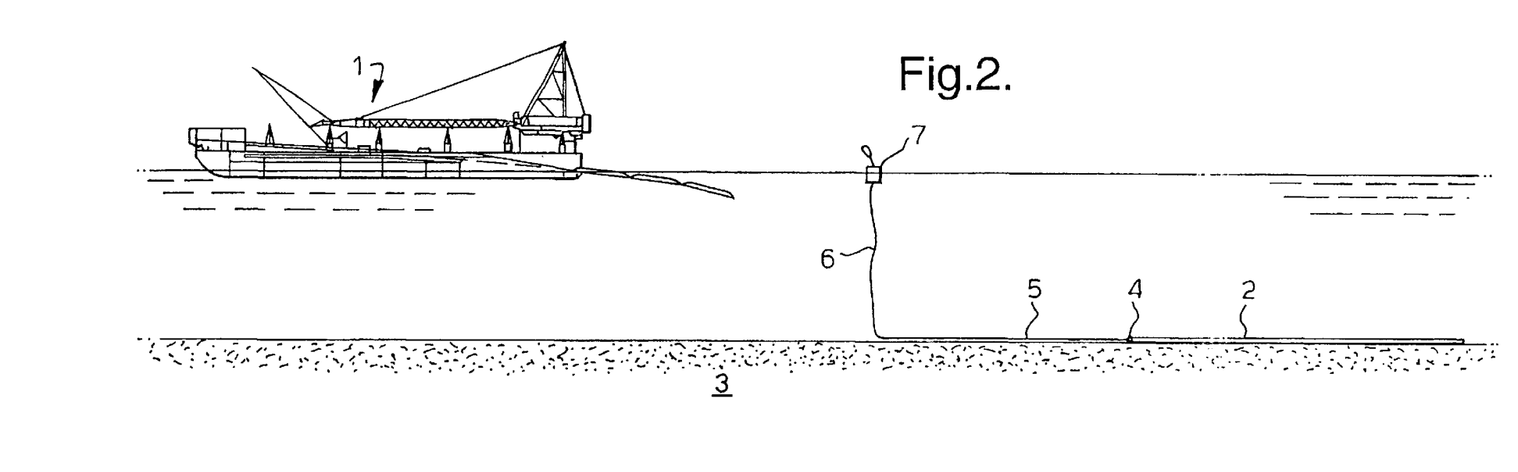
FIG. 2 shows the vessel of FIG. 1 abandoning a pipeline and rope in shallow waters according to the prior art.

It is convenient first to describe briefly a conventional A/R method and system of the kind used when laying a pipeline in water that is not deep. FIGS. 1 and 2 illustrate such a method. In FIG. 1 a vessel 1 is shown that has been laying a pipeline 2 on the seabed 3 but has interrupted laying, for example because of bad weather. At a stage when the end of the pipeline 2 was about to leave the vessel, an abandonment/recovery head 4 was welded to the end of the pipeline and a steel rope 5 connected to the head 4. The other end of the steel rope 5 is mounted on a winch (not shown) on the vessel 1.

After connection of the rope, tension in the sealine is maintained by the winch rather than the pipeline laying and tensioning mechanism provided on the vessel for use during normal laying. The vessel continues laying the end portion of the pipeline 2 as the steel rope 5 is let out from the winch under tension. Once the head 4 has reached the seabed (the stage shown in FIG. 1), the tension in the rope 5 can be released. In reasonable conditions, the rope 5 remains connected to the winch on the vessel 1, enabling the pipeline to be recovered relatively quickly and simply by reversing the operations described above.

In very poor weather conditions or other extreme circumstances the vessel 1 completely abandons the rope 5 as shown in FIG. 2. The rope 5 lies substantially flat on the seabed, as does the pipeline 2. The rope 5 is connected, at the end which is not connected to the A/R head 4, to a pennant line 6, which is in turn connected to a marker buoy 7. The connection of the pennant line 6 to the rope 5 can be carried out on the vessel.

The vessel 1 shown in FIGS. 1 and 2 is an S-lay vessel; that is, the pipeline 2 generally has the form of an elongated "S" during the laying procedure. Such an S-lay vessel is most suitable for laying a pipeline in relatively shallow water.

The A/R system and method that will now be described with reference to the remaining drawings is especially suited for the case where a pipeline is being laid in deep water using the J-lay technique, in which the pipeline generally has the form of a "J" during the laying procedure.

In order to aid understanding of the new A/R system and method it will first be described in overview and, thereafter, details of particular parts of the system and method will be provided.

Figure 3:
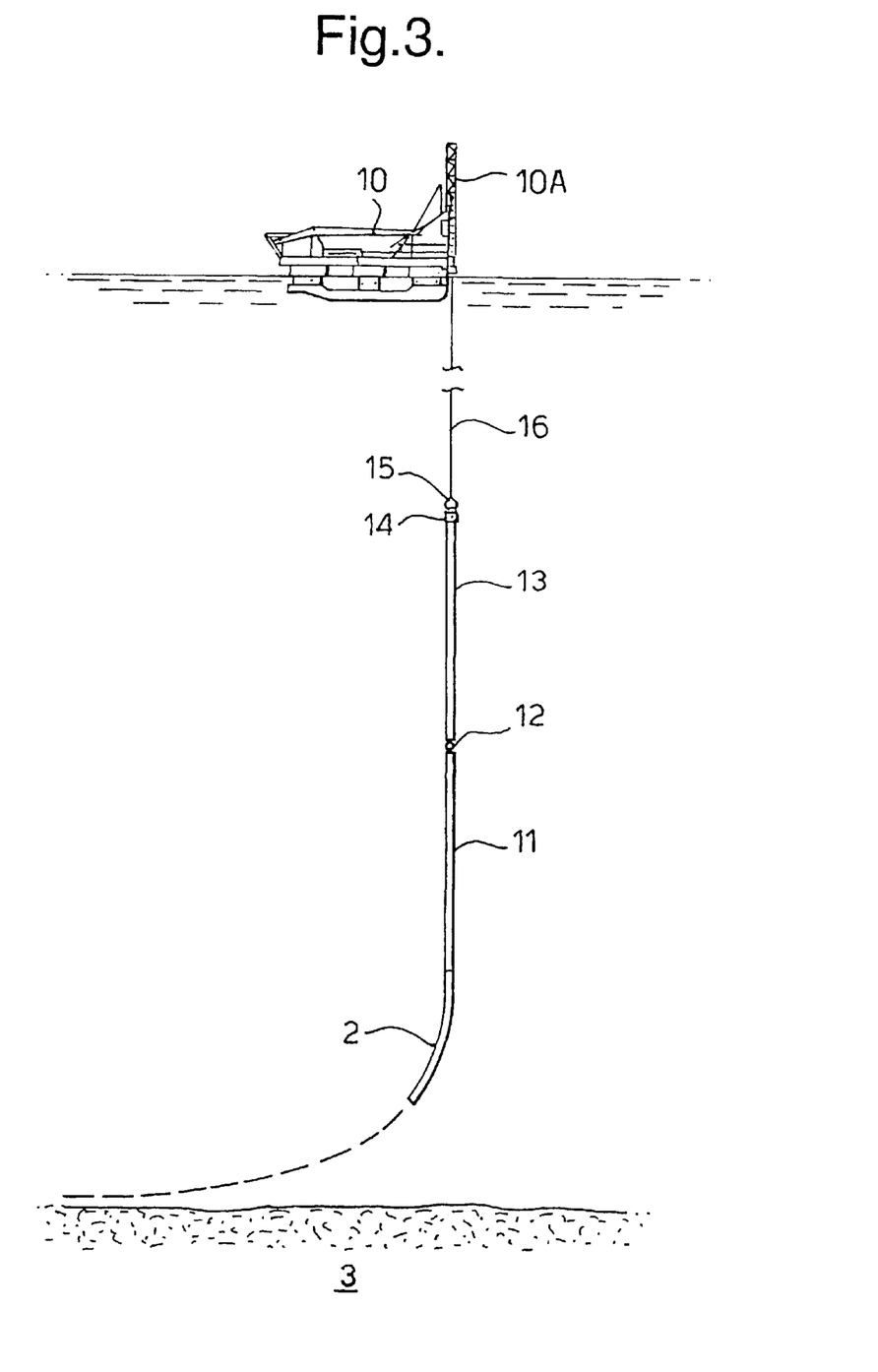
FIG. 3 shows an A/R system embodying the invention, shortly after the abandonment process has been initiated and before the end of the pipeline to be abandoned has reached the seabed.
Figure 4A:
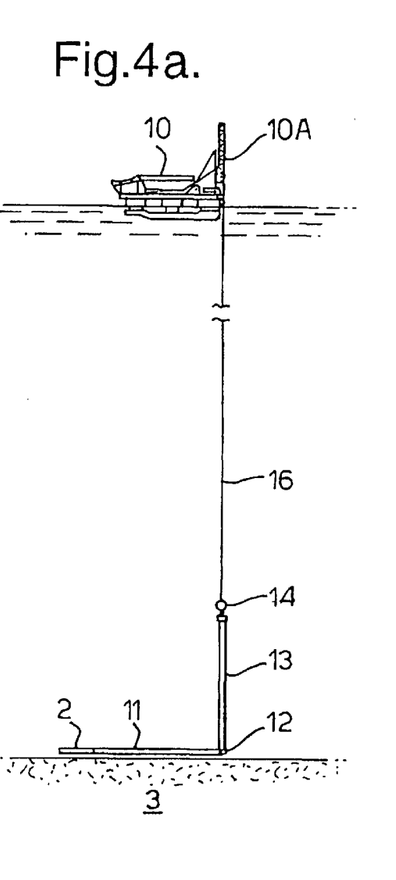
FIGS. 4a to 4c show progressive stages in the process of abandoning the pipeline.
Figure 4B:
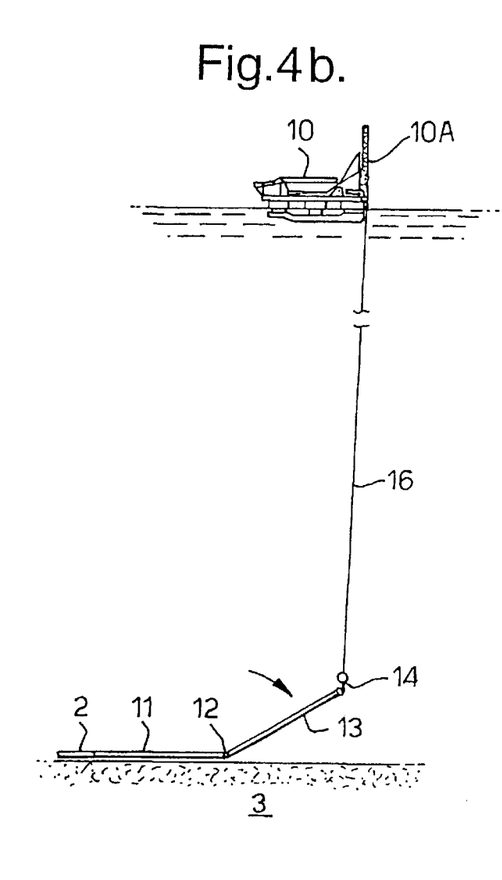
Figure 4C:
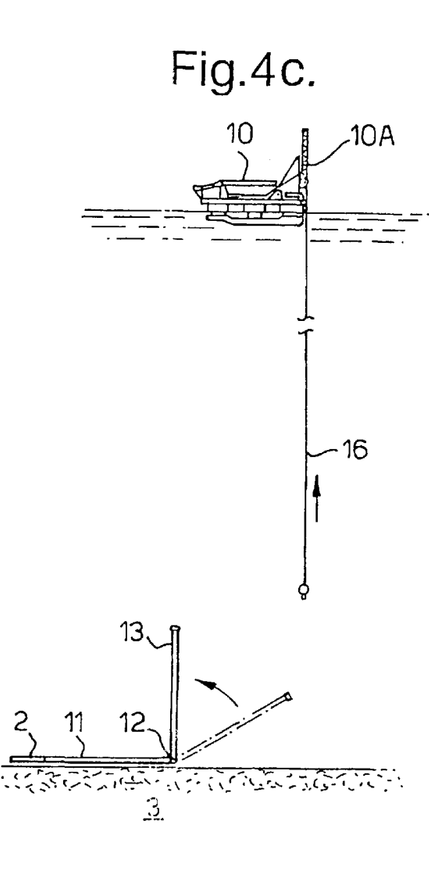
Figure 5A:
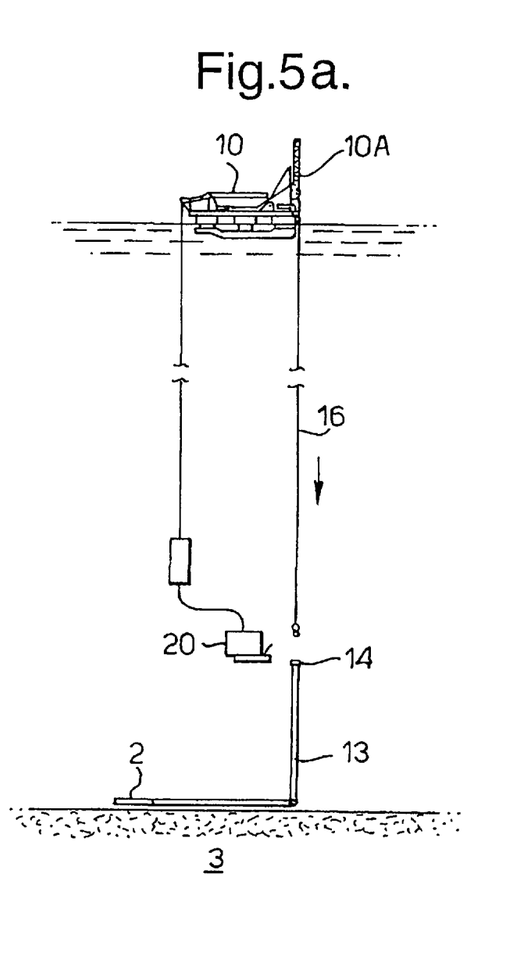
FIG. 5a shows the arrangement of the system when recovery of the pipeline is just about to begin.
Figure 5B:
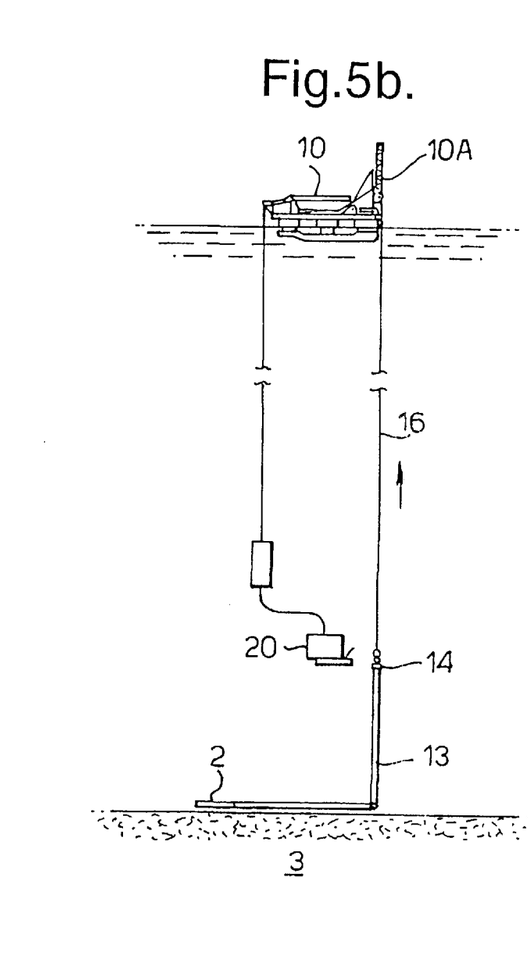
FIG. 5b shows the next stage in the recovery process.

The A/R method and system is illustrated in FIGS. 3 to 5. At the commencement of the abandonment procedure the pipeline 2 is being laid, using a J-lay technique, by the vessel and the end of the pipeline is at the vessel, indicated by reference numeral 10 and is being allowed to pass down a tower 10A of the vessel. A tensioning arrangement of a kind known per se is provided on the tower 10A; as the pipeline is laid, so lengths of pipe are added to the end of the pipeline in a manner known per se. One suitable form of vessel and tower arrangement is described in our application No. PCT/EP99/05201.

At the stage where it is decided to abandon the pipeline, the pipe laying operation is changed: instead of welding a further length of pipe to the end of the pipeline 2, an intermediate string 11 of the same diameter as the pipe is welded to the end of the pipeline 2. In a particular example the intermediate string has a length of about 48 m and a diameter of about 60 cm; it is made of steel and sealed at each end.

The intermediate string 11 is passed down the tower 10A using the tensioning arrangement on the tower in the same way as an ordinary length of pipe.

One end of an abandonment string 13 is connected to the upper end of the intermediate string 11; in this case, however, in place of a welded connection, a special joint 12 (referred to herein as a seabed joint) is provided between the intermediate string 11 and the abandonment string 13. The seabed joint 12 allows rotation of the adjoining end of the abandonment string about the longitudinal axis of the intermediate string 11 and also allows pivoting of the abandonment string 13 about an axis perpendicular to its longitudinal axis.

The abandonment string 13 is of the same diameter as the pipe forming the pipeline 2 and in the particular example described has a length of about 50 m and a diameter of about 60 cm. The abandonment string is made principally of a glass fibre reinforced vinyl ester resin, is sealed at both ends, and is highly buoyant in water.

The abandonment string 13 is also passed down the tower 10A using the tensioning arrangement on the tower in the same way as an ordinary length of pipe.

As the abandonment string 13 is lowered into the water it is pulled down by the intermediate string 11, overcoming the upward buoyancy force due to the submerging of the string 13. As a result the tension in the sealine is at a maximum at the joint between the intermediate string 11 and the buoyant abandonment string 13 and reduces upwardly along the length of the abandonment string 13 to a minimum at sea level. Therefore as the abandonment string 13 is lowered into the water the tension that has to be accommodated in the tower 10A reduces.

A connector 14 (referred to herein as an A/R connector) is provided at the upper end of the abandonment string 13 and one end of a steel rope 16 is connected, via the A/R connector, to the abandonment string 13. The steel rope is connected to a winch (not shown) on the vessel.

Once the upper end of the abandonment string 13 has reached the lower end of the tower 10A and the rope 16 has been connected, the tension in the sealine is transferred from the tensioning arrangement on the tower 10A to the winch. It should be noted that the tension that the winch has to withstand is less than the tension that was accommodated during laying of the pipeline by the tower 10A and also less than the tension in the pipeline 2 at its end connected to the intermediate string 11.

The steel rope 16 is then let out from the winch lowering the pipeline 2 and strings 11, 13 towards the seabed, to the position shown in FIG. 3 (where the lowermost part of the pipeline is merely represented by a dotted line).

The strings 2, 11, 13 are lowered to the seabed by the A/R winch.

As previously described, the intermediate steel string 11 and the abandonment string 13 are free to rotate and pivot relative to one another about the joint 12 so that, regardless of the orientation of the string 11 on the seabed, the axis of pivoting of the string 13 can adjust itself to be horizontal. FIG. 4a shows the situation after further letting out of the steel rope 16 from the winch: the pipeline 2 and intermediate string 11 are lying flat on the seabed 3 and the buoyant abandonment string 13 has pivoted about joint 12 so that it is substantially vertical. The A/R winch then lowers the steel rope 16 further so that the abandonment string 13 becomes inclined to the vertical as shown in FIG. 4b. When the abandonment string 13 is inclined at about 60° to the vertical, the A/R connector 14 automatically disconnects the rope 16 from the string 13 and the rope is then winched back to the vessel 10. The abandonment string 13 is then free and pivots about joint 12 back to the vertical under its own buoyancy to the position shown in FIG. 4c.

When conditions permit recovery of the pipeline 2, connection of the string 13 via the A/R connector 14 to the rope 16 can be performed by manoeuvring the vessel 10 to the required position and using an ROV 20 as shown in FIG. 5a. The rope 16 can then be guided to the A/R connector 14 with the help of an acoustic camera or sonar and the connection re-established following an actuation signal from the vessel 10 or by a physical manipulation by the ROV 20; for example, a manipulator of the ROV can operate a ball valve, installed in a dedicated ROV panel on the upper part of the A/R connector 14, as will be described further below. FIG. 5b shows the situation after the connection has been made.

As will be appreciated, in order to complete recovery of the end of the pipeline, the various operations described above in respect of lowering of the pipeline to the seabed are reversed. Thus, the winch is used to haul in the steel rope 16 until the A/R connector 14 reaches the tower 10A of the vessel; tension in the string 13 is then transferred from the winch to the tower 10A; the rope 16 disconnected; the string 13 raised up the tower and, once the string 11 reaches the tower 10A, the string 13 is disconnected from the string 11; the string 11 is then raised up the tower until the upper end of the pipeline 2 reaches the tower 10A; the string 11 is then cut from the pipeline 2; thereafter laying of the pipeline can begin again.

Figure 6A:
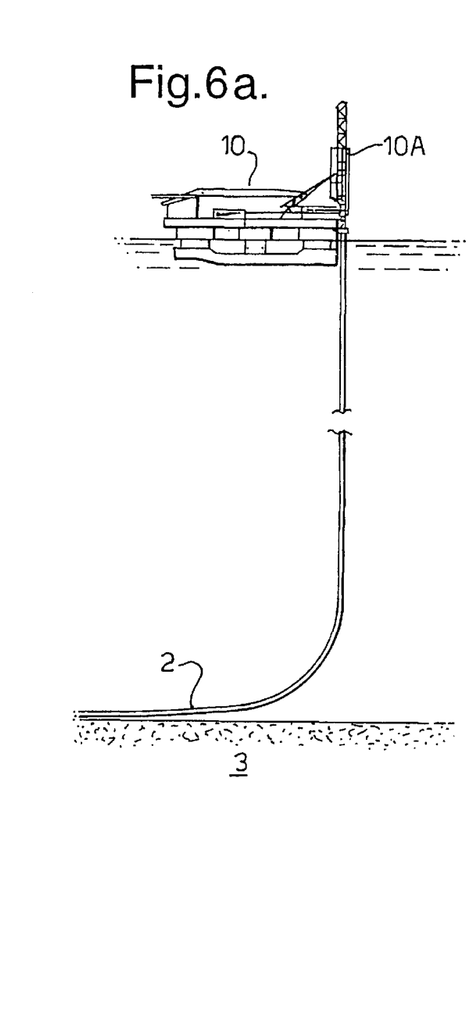
FIGS. 6a to 6c show progressive stages, comparable to FIGS. 4a to 4c, in a slightly modified process of abandoning the pipeline.
Figure 6B:
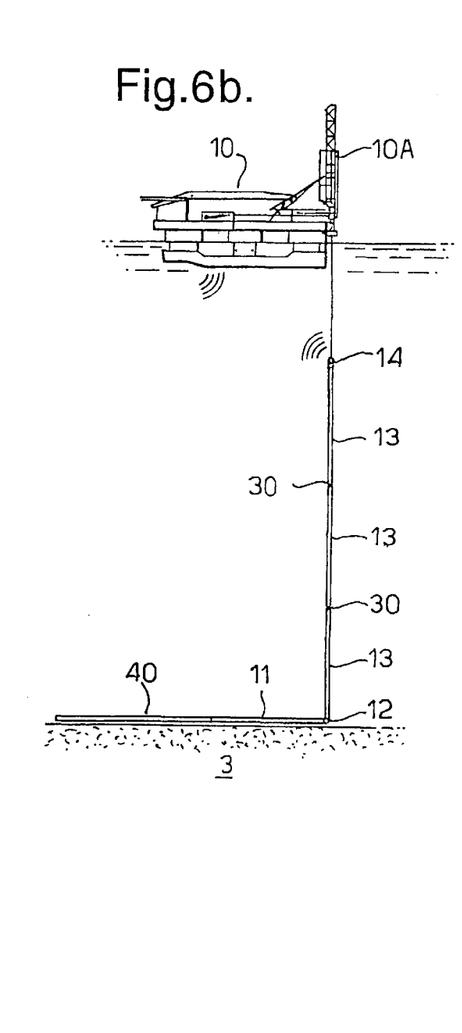
Figure 6C:
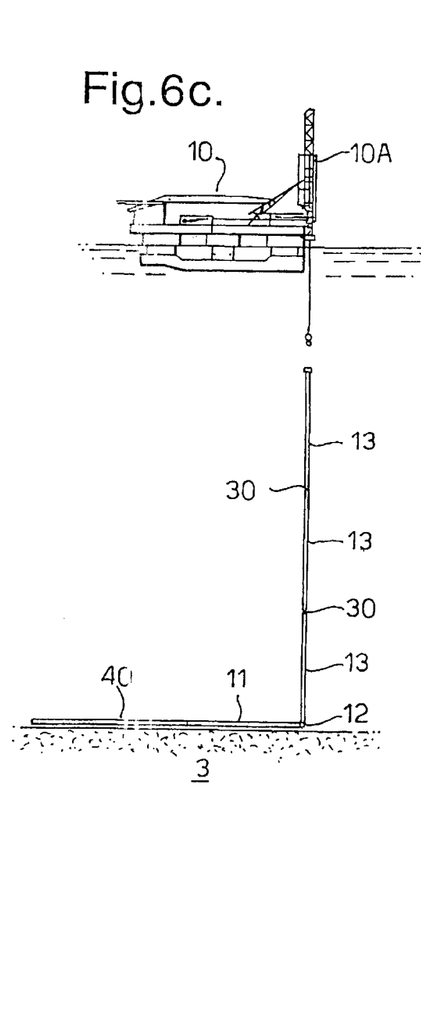

FIGS. 6a to 6c show a modification that can be made to the procedure described above. In that case, instead of there being one length of abandonment string 13 there are several lengths (in the particular example shown, three lengths). That enables the tension at the upper end of the sealine to be reduced further before the tension is borne by the rope 16 rather than by the tower 10A. Such an arrangement can be useful when operating in very deep water assuming that the part of the pipeline extending between the vessel and the seabed is flooded; in that case the tension at the upper end of the pipeline 2 at the beginning of the abandonment process will be higher and therefore more than one abandonment string 13 may be required to reduce the tension to a level that the winch can accommodate.

A quick connector 30 can be used to make the connections between the abandonment strings 13. Such connectors, enabling connections to be made between strings at a welding station on the tower 10A are available commercially. An example is the Merlin connector of Oil States Industries (UK) Ltd.

Another modification to the procedure described above to reduce the tension that the winch has to accommodate in the case of a flooded pipeline is to connect a number of lengths 40 of sealed empty pipeline to the end of the pipeline 2, prior to connecting the intermediate string 11. Such a procedure can be adopted instead of or as well as the use of a plurality of abandonment strings 13. Such lengths of sealed empty pipeline are preferably provided at each end with valves to allow fluid flow along those lengths if or when desired.

Having now provided an overview of the system and a description of the procedure adopted, particular examples of designs for component parts of the system will be described.

Figure 7:
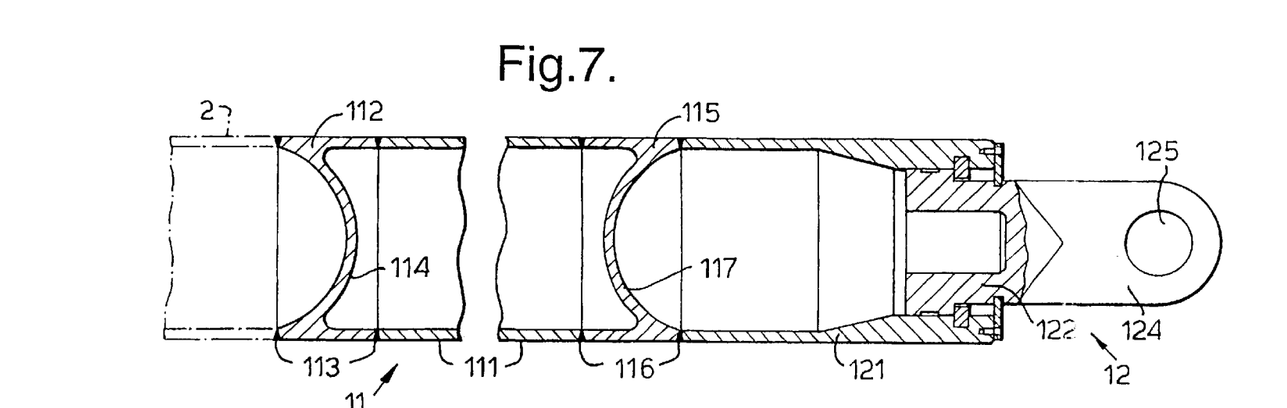
FIG. 7 is a sectional view of an intermediate string for use in the described embodiment.

FIG. 7 shows the construction of the intermediate string 11 referred to above. At the left hand side of the drawing, the end of the pipeline 2 is shown in dotted outline. The string 11 is formed principally of a main central section 111 and has two end sections 112 and 115. The end section 112 is connected by welds 113 to the pipeline 2 and to the central section 111; the end section 112 incorporates a hemispherical section 114 which provides a seal between the pipeline 2 and the interior of the string 11. Similarly the end section 115 is connected by welds 116 to a first part 121 of the joint 12 and incorporates a hemispherical section 117 which provides a seal between the interior of the string 11 and the unsealed joint 12.

Figure 8A:
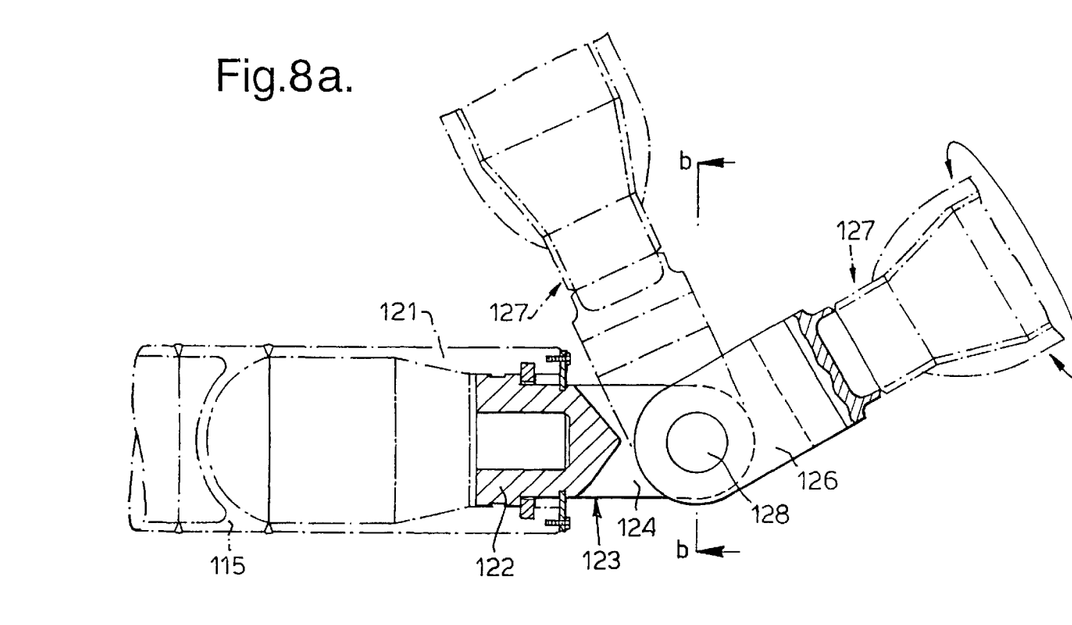
FIG. 8a is a sectional view of a seabed joint connected to one end of the intermediate string.
Figure 8B:
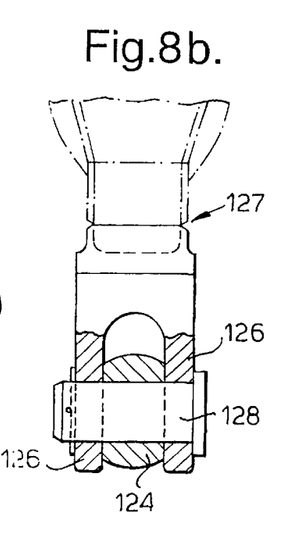

FIGS. 8a and 8b show the construction of the joint 12. The first part 121 is hollow of generally circular cross-section and houses a cylindrical part 122 of a connector element 123 that is rotatably mounted in the part 121 for rotation about the central longitudinal axis of the intermediate string 11. The connector element 123 has, at the opposite end to the cylindrical part 122, a central pivot mounting 124 having a transverse through bore 125 (FIG. 7). A pair of forked arms 126 of a third part 127 of the connector extend on either side of the pivot mounting 124 and have transverse through bores aligned with the bore in the mounting 124. A pin 128 passes through the aligned through bores and provides a pivot mounting of the third part 127 relative to the connector element 123.

When in use the intermediate string 11 is resting on the seabed, the third part 127 (to which the abandonment string 13 is connected, as will be described below) is able to pivot relative to the connector element 123 from a position in which the string is at an angle of 60° to the vertical (the position shown in FIG. 4b and one of the positions shown in dotted outline in FIG. 8a) through a vertical position to a position inclined backwardly at an angle of 25° to the vertical (the other of the extreme positions shown in dotted outline in FIG. 8a).

Figure 9:
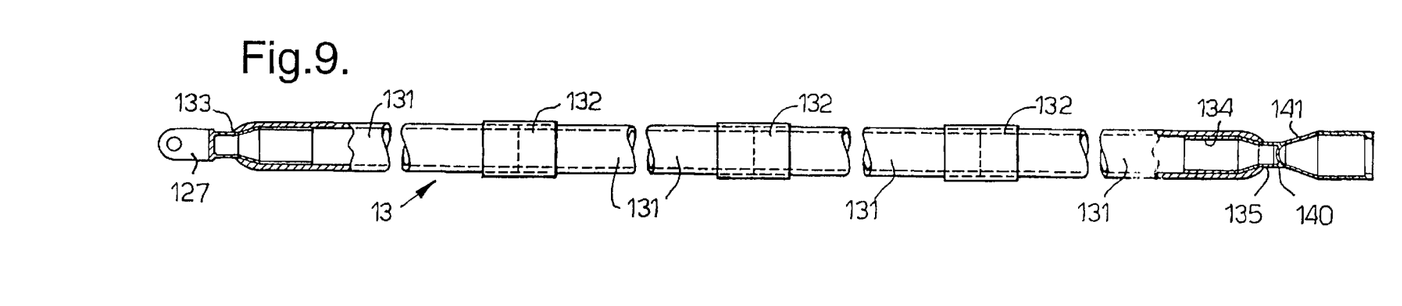
FIG. 9 is a sectional view of an abandonment string for use in the described embodiment.

The abandonment string 13 is shown in FIG. 9. It generally comprises a series of tubular members 131 joined together at welded butt strap joints 132. In the example shown four tubular members 131 make up one abandonment string 13. The third part 127 of the seabed joint terminates in an annular portion 129 which is welded to a matching annular portion 133 of a steel insert provided at the adjoining end of the abandonment string 13. The steel insert 133 is fixed in the member 131 at the time that the string is formed and has annular grooves at the interface with the glass reinforced resin of the member 131 so that a pressure resistant watertight and strong mechanical connection is formed between the steel insert and the member 131.

At the other end of the abandonment string a similar steel insert 134 is provided fixed inside its respective tubular member 131 in the same way as the insert 133.

Figure 10:
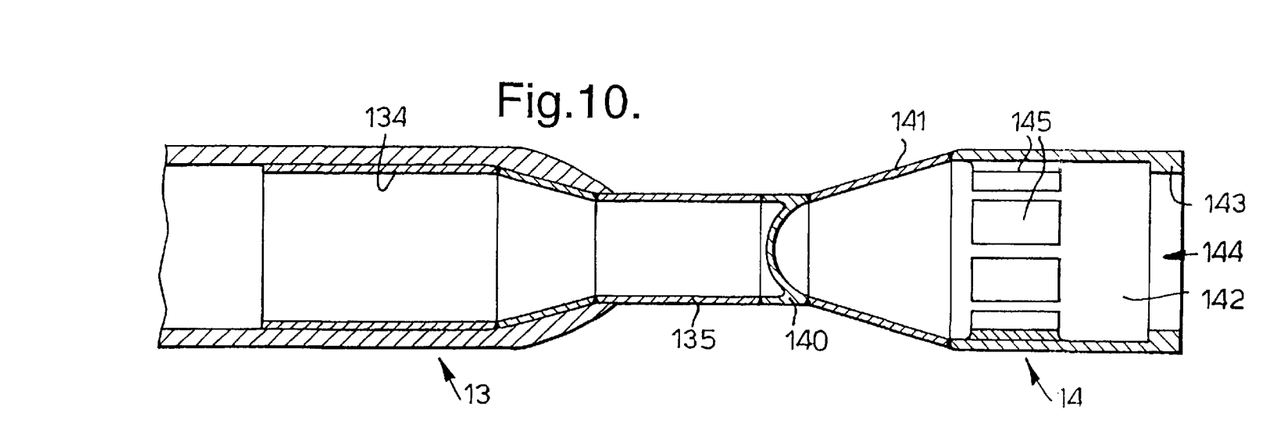
FIG. 10 is a sectional view of a female part of a connector fixed to an end of the abandonment string of FIG. 9.

The insert 134 terminates in a tubular portion 135 which can be welded to a corresponding portion 140 of a female part 141 of the A/R connector 14 as shown in FIG. 10.

Figure 11A:
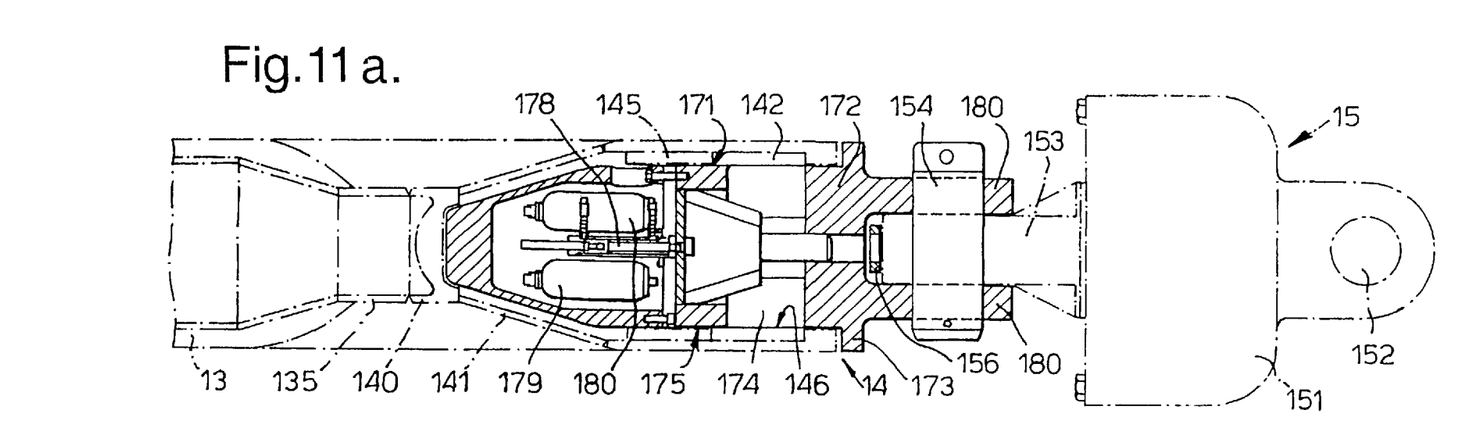
FIG. 11a is a sectional view of a male part of the connector whose female part is shown in FIG. 10, with the connector shown in a released (retracted) state.
Figure 11B:
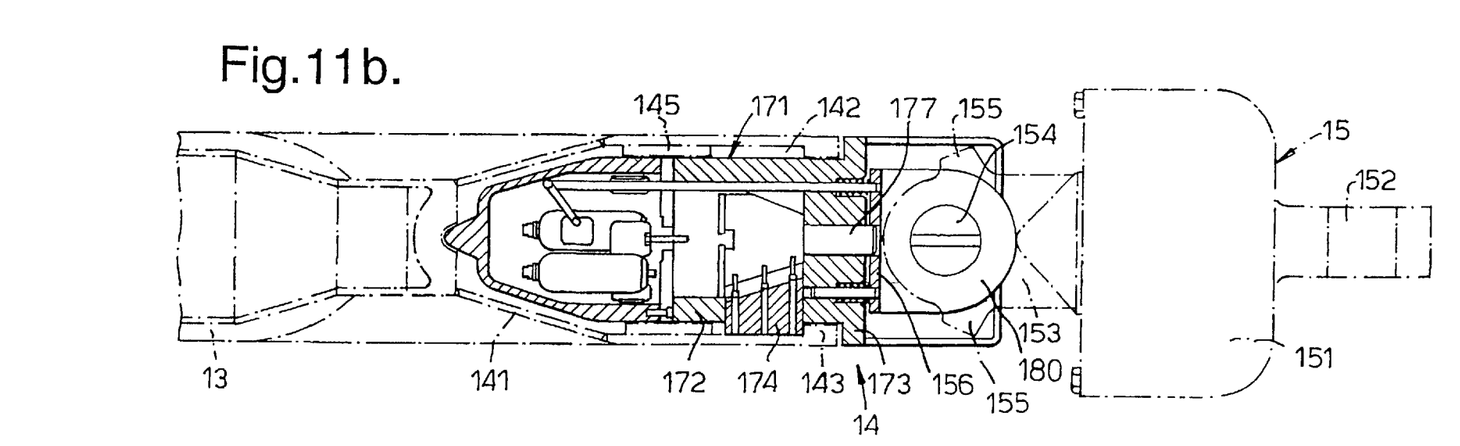
FIG. 11b is a sectional view in a plane perpendicular to the plane of the section of FIG. 11a of the male part shown in FIG. 11a, with the connector shown in a locking (extended) state.

Referring now to FIGS. 10, 11a and 11b, the structure and operation of the A/R connector 14 will be described. The female part 141 generally comprises a hollow cylindrical cavity 142 of circular cross-section formed with an inwardly projecting lip 143 around an open end 144. A series of six pads 145 are equiangularly spaced around the interior of the cavity to provide guide surfaces for receiving a male part of the connector, as will be described below.

FIGS. 11a and 11b show the male part 171 of the connector 14 in section, with the female part 141 and the end of the abandonment string 13 being shown in dotted outline. It will be seen that the male part 171 has a main body part 172 shaped to fit within the female part 141 with a frusto-conical leading end to assist entry into the female part. A peripheral flange 173 on the body part limits the penetration of the male part 171 into the female part 141. It will also be seen that the main body part 172 is a close fit within the pads 145. Six locking members 174 are mounted in the main body part 172 and are equiangularly spaced around the body part. The locking members 174 are each movable radially between a restricted position shown in FIG. 11a where the radially outermost surface of each member is flush with a circumferential surface 175 of the main body part, and an extended position shown in FIG. 11b where the radially outermost surface of each member projects outwardly against the interior of a peripheral wall 146 of the female part 141. As can be seen in FIGS. 11a and 11b, when the members 174 are in the retracted position shown in FIG. 11a, the male part 171 of the connector can move freely in and out of the female part 141, but when the members 174 are in the extended position, the male part 171 is held within the female part 141 by the engagement of the members 174 with the lip 143 of the female part 141.

Radial movement of the locking members 174 is controlled by axial movement of a wedge member 176 which cammingly engages sloping rear surfaces on the locking members 174 to extend the members and also has keyways in which projecting parts of the locking members 174 engage to retract the members. Thus, movement of the wedge member 176 along the longitudinal axis of the connector to the right as shown in FIGS. 11a and 11b serves to extend the members 174 and movement to the left serves to retract them. The wedge member 176 is axially mounted by a guide rod 177 engaging a central bore in the main body part 172 and its movement is controlled by a double acting hydraulic cylinder 178 pressurised by a nitrogen pre-charged accumulator 179. An oil discharge tank 180 is also provided.

In the particular example described the hydraulic circuit is arranged so that actuation to cause the cylinder 178 to extend the locking members is achieved by contact of a manipulator on the ROV 20 to actuate a ball valve (not shown) in the vicinity of the flange 173 of the male part 171 of the connector 14, whilst actuation to cause the cylinder 178 to retract the locking members is achieved by contact of a connector part 15 connected to the end of the rope 16 as will now be further described.

The connector part 15 is shown in dotted outline in FIGS. 11a and 11b. It has a main body part 151 at one end of which there is an eye 152, to which the steel rope 16 (not shown) is connected and at the opposite end of which a coupling part 153 connected to the male part 171 of the connector 14 is provided. For this purpose the male part 171 has a pair of forked arms 180 between which the coupling part 153 is received, as best seen in FIG. 11a. The forked arms 180 and the coupling part 153 have aligned bores through which a pin 154 passes connecting together the connector part 15 and the male part 171, whilst allowing pivotal movement of one part relative to the other.

The coupling part 153 is formed with a pair of lugs 155. When the steel rope 16 and the abandonment string 13 are aligned, the parts are in the relative positions shown in FIG. 11b, but as the rope 16 becomes inclined to the string 13 as shown in FIG. 4b, so the coupling part 153 pivots relative to the male part 171 and, in the example illustrated, after pivoting through 60°, one of the lugs 155 comes into contact with and passes against a spring loaded actuator plate 156. Depressing the actuator plate 156 against its spring bias serves to actuate a ball valve controlling the hydraulic cylinder 178 to retract the locking members 174, leaving the male and female parts of the connector 14 free to separate from one another.

In the event that the connector 14 does not operate properly the intermediate string 11 on the seabed can be cut using an ROV, another connection made to the cut end of the intermediate string 11 and the pipeline thereafter recovered.

In the embodiment of the invention described above the abandonment string is made from tubular members of glass fibre reinforced vinyl ester resin. Other materials that may be used include other composite materials such as kevlar, carbon, titanium, aluminium or another material having a high tensile strength and low density. The axial force due to the weight of the pipeline in the water and the external pressure due to the water depth at various stages of the operation need to be taken into account when choosing a material and a design for the abandonment string 13.

If desired, a swivel may be incorporated in the connection of the steel rope 16 to the coupling part 153 of the connector part 15.

In the case of the A/R connector described in detail above with reference to FIGS. 10, 11a and 11b, actuation of the cylinder 178 is achieved by a mechanical actuation generated either automatically by pivoting of the coupling part 153 or by a manipulator arm of an ROV. Other forms of remote actuation may be provided, either in place of or in addition to those described; for example actuation may be effected by an acoustic signal from the vessel 10.

The intermediate string 11 may be provided with valves in the hemispherical sections 114, 117 to allow liquid flow along the string and/or with one or more valves to allow seawater surrounding the sealine to enter the hollow interior of the string 11. It is advantageous to provide such valves so that the intermediate string can be flooded and pressures equalised in the event that the A/R system does not operate and the intermediate string is to be cut.

The A/R method and system described above provide numerous advantages. Firstly it is possible to employ a winch and rope whose load bearing capacities are substantially less than the tension in the pipeline during laying. It therefore becomes viable to perform the abandonment/recovery operation even in deep water. Also the buoyant nature of the abandonment string 13 means that connections and disconnections between the steel rope 16 and the string 13 are made at a location well clear of the seabed, thereby facilitating those operations. Furthermore, the nature of the connections between the pipelines 2 and the intermediate string 11, between the intermediate string 11 and the abandonment string 13, and between the abandonment string 13 and the rope 16 are such that they can be made and unmade relatively simply and quickly. With a system of the kind described above it is practical to abandon and recover a pipeline of 60 cm diameter at a water depth of 2200 m using a winch with a safe working load (SWL) of 5500 kN and a steel rope of diameter 120 mm.

What is claimed is:

1. A method of abandoning a pipeline being J-laid by a vessel, wherein a sealine comprising the pipeline is initially held by a pipe laying and tensioning arrangement, the method including the steps of reducing the tension at sea level of the sealine, and thereafter lowering the end of the sealine towards the seabed using a line from a winch on the vessel, thereby enabling the maximum load bearing capacity of the winch to be substantially less than the maximum load bearing capacity of the pipe laying and tensioning arrangement.

2. A method according to claim 1, in which the step of reducing the tension at sea level of the sealine being laid by the vessel comprises connecting one or more light elongate members to the end of the pipeline and lowering the elongate members into the sea.

3. A method according to claim 2, in which at least one of the elongate members is buoyant.

4. A method according to claim 3, in which said at least one elongate member is composed principally of a material selected from the group consisting of glass fibre reinforced resins, composite materials, carbon, titanium and aluminum.

5. A method according to claim 4, in which said at least one elongate member is composed principally of a glass fibre reinforced vinyl ester resin.

6. A method according to claim 3, in which an intermediate elongate member is connected between the end of the pipeline and the buoyant elongate member.

7. A method according to claim 6, in which the intermediate elongate member is hollow and is sealed against the ingress of water.

8. A method according to claim 7, in which the intermediate elongate member includes a valve to enable the interior of the hollow elongate member to be flooded by sea water.

9. A method according to claim 6, further including the step of cutting the intermediate elongate member, connecting the winch line to the end of the elongate member that is connected to the pipeline and recovering the end of the pipeline.

10. A method according to claim 3, in which said at least one elongate member is connected to the pipeline through a connection which allows pivoting of the elongate member about a horizontal axis when the pipeline is lying horizontally.

11. A method according to claim 2, in which the one or more elongate members are lowered using the pipe laying and tensioning arrangement on the vessel that is used for laying the pipeline.

12. A method according to claim 11, in which the load bearing capacity of the winch is substantially less than the load bearing capacity of the tensioning arrangement.

13. A method according to claim 1, further including the subsequent step of disconnecting the sealine from the winch line.

14. A method according to claim 13, in which an ROV is provided and the disconnection of the sealine from the winch line is initiated by physical contact of the ROV with a connector connecting the sealine to the winch line.

15. A method according to claim 13, in which the disconnection of the sealine from the winch line is initiated remotely.

16. A method according to claim 15, in which the disconnection of the sealine from the winch line is effected by a signal transmitted remotely from an ROV or the vessel.

17. A method according to claim 16, in which the signal is an acoustic signal.

18. A method according to claim 15, in which the disconnection takes place automatically at a predetermined angle of the adjoining ends of the winch line and the sealine.

19. A method according to claim 18, in which the predetermined angle is in the range of 45° to 75°.

20. A method according to claim 13, in which the energy required for the disconnection is stored in the connecting arrangement.

21. A method according to claim 13, in which after disconnection of the sealine from the winch line an end portion of the sealine projects upwards from the seabed.

22. A method according to claim 1, further including recovering the abandoned pipeline by carrying out the further steps of raising the end of the sealine to the vessel using the winch, and raising the sealine further using the pipe laying and tensioning arrangement on the vessel that is used for laying the pipeline.

23. A method according to claim 22, in which the further steps include a preliminary step of connecting the winch line to the sealine.

24. A method of abandoning a pipeline being laid by a vessel, including the steps of connecting one or more buoyant elongate members to the end of the pipeline, thereafter lowering the elongate members into the sea and then abandoning the pipeline, wherein one or more elongate members are so connected to the pipeline that the end of the elongate member at the end of the pipeline projects upwardly from the seabed, thereby facilitating the future recovery of the pipeline.

25. A method for disconnecting a winch line from a pipeline, the method including the steps of:
  connecting a first part of a connector to the pipeline,
  providing a second part of the connector on the winch line, the first and second parts being able to mate with one another and being provided with a locking/unlocking arrangement that can be remotely actuated,
  mating the first and second parts of the connector and locking them together, and
  when the first and second parts of the connector are underwater, remotely actuating the locking/unlocking arrangement to unlock the parts and thereafter disconnecting the parts.

26. A disconnection system for disconnecting a winch line from a pipeline, the system comprising: first and second parts of a connector and a locking mechanism, wherein the first part is connectable to a pipeline, the second part is connectable to a winch line, the first and second parts are able to be connected and locked together by the locking mechanism, and the first and second parts are able to be unlocked when underwater by remote actuation of the locking mechanism.

27. A pipe laying vessel including a pipe laying and tensioning arrangement for withstanding the tension exerted by a pipeline during laying of the pipeline and an A/R system comprising an A/R winch and line, the winch and line being suitable for use when abandoning a pipeline during laying, and one or more light elongate members, wherein the light elongate members are configured for connecting to a pipeline for the purpose of reducing the tension at sea level of a sealine comprising or consisting of the pipeline, and the safe working load of the winch is lower than the safe working load of the pipe laying and tensioning arrangement.

28. A method of abandoning a pipeline being laid by a vessel, wherein a sealine comprising the pipeline is initially held by a pipe laying and tensioning arrangement used for laying the pipeline, the tension at sea level of the sealine being at a first level, the method including the steps of
  (i) connecting one or more buoyant elongate members to the end of the pipeline,
  (ii) using the pipe laying and tensioning arrangement to lower the elongate members into the sea, thereby reducing the tension at sea level of the sealine,
  (iii) thereafter holding the sealine with the pipe laying and tensioning arrangement with the tension at sea level of the sealine being at a second level substantially lower than the first level,
  (iv) thereafter lowering the end of the sealine towards the seabed using a line from a winch on the vessel, and
  (v) thereafter disconnecting the sealine from the winch line
  wherein the maximum load bearing capacity of the winch is substantially less than the maximum load bearing capacity of the pipe laying and tensioning arrangement.

29. A method of abandoning a pipeline being laid by a vessel, wherein a sealine comprising the pipeline is initially held by a pipe laying and tensioning arrangement, the method including the steps of
  (i) reducing the tension at sea level of the sealine by
    (a) connecting one or more buoyant members to the end of the pipeline,
    (b) connecting an intermediate elongate member between the end of the pipeline and a buoyant elongate member, and
    (c) lowering the elongate members into the sea,
  (ii) thereafter lowering the end of the sealine towards the seabed using a line from a winch on the vessel, the method thereby enabling the maximum load bearing capacity of the winch to be substantially less than the maximum load bearing capacity of the pipe laying and tensioning arrangement.

30. An A/R system including a winch and line and one or more light elongate members, wherein the A/R system is adapted for carrying out a method of abandoning a pipeline on a vessel having a pipe laying and tensioning arrangement, and the one or more light elongate members are so shaped and configured (i) to be connectable to the end of the pipeline held by the pipe laying and tensioning arrangement to form a sealine, and (ii) to be able to be lowered into the sea by the pipe laying and tensioning arrangement, so that the tension at sea level of the sealine may be reduced before connecting the line of the winch to the pipeline via the one or more light elongate members,
  whereby the maximum load bearing capacity of the winch may be substantially less than the maximum load bearing capacity of the pipe laying and tensioning arrangement.

31. An A/R system including a winch and line, one or more buoyant elongate members and an intermediate elongate member, wherein the A/R system is arranged to be suitable for carrying out a method of abandoning a pipeline on a vessel having a pipe laying and tensioning arrangement for laying and holding a pipeline, the one or more buoyant elongate members are so shaped and configured to be connectable between the end of the pipeline and a buoyant elongate member, the intermediate elongate member is so shaped and configured to be connectable to the end of a sealine comprising the pipeline, and the elongate members are so shaped and configured to be able to be lowered into the sea by the pipe laying and tensioning arrangement, so that the tension at sea level of the sealine may be reduced before connecting the line of the winch to the pipeline via the one or more elongate members, whereby the maximum load bearing capacity of the winch may be substantially less than the maximum load bearing capacity of the pipe laying and tensioning arrangement.

32. An A/R system including a winch and line and one or more light elongate members, wherein the A/R system is arranged to be suitable for carrying out a method of abandoning a pipeline on a vessel, and the one or more light elongate members are so shaped and configured to be connectable to the end of the pipeline so that after abandonment of the pipeline the end of the elongate member at the end of the pipeline projects upwardly from the seabed, thereby facilitating the future recovery of the pipeline.

33. An A/R system including a winch and line and at least one buoyant elongate member, wherein the A/R system is arranged to be suitable for carrying out a method of abandoning a pipeline on a vessel, and the buoyant elongate member includes a pivot joint that facilitates pivoting movement of the end of the buoyant elongate member about a position at or near the end of a sealine comprising the pipeline, the buoyant elongate member being buoyant enough that after abandonment of the pipeline the end of the elongate member at the end of the pipeline projects upwardly from the seabed, thereby facilitating the future recovery of the pipeline.

34. An A/R system according to any of claims 30 to 33 including a pipe-laying and tensioning arrangement, wherein the maximum load bearing capacity of the winch is substantially less than the maximum load bearing capacity of the pipe laying and tensioning arrangement.

35. An A/R system according to claim 30 including one or more buoyant elongate members.

36. An A/R system according to claim 31 or 35, including a joint for connecting the one or more buoyant elongate members to the pipeline.

37. An A/R system according to claim 36, in which the joint allows pivotal movement of the one or more buoyant elongate members about an axis transverse to the longitudinal axis of the end of the pipeline.

38. An A/R system according to claim 37, in which the joint also allows pivoting of the one or more buoyant elongate members about the longitudinal axis of the end of the pipeline.

39. An A/R system according to any of claims 31, 33 and 35, including a connector for connecting the winch line releasably to the one or more buoyant elongate members.

40. An A/R system according to claim 39, in which the connector includes a stored energy arrangement for providing energy to actuate the release of the winch line from the one or more buoyant elongate members.

41. An A/R system according to claim 40, in which the release of the winch line is hydraulically actuated.

42. A pipe laying vessel including a pipe laying and tensioning arrangement for withstanding the tension exerted by a pipeline during laying of the pipeline and an A/R system comprising an A/R winch and line, the winch and line being suitable for use when abandoning a pipeline during laying, and one or more buoyant elongate members, wherein the buoyant elongate members are configured for connecting to the end of a pipeline for the purpose of reducing the tension at sea level of a sealine comprising the pipeline, the one or more buoyant elongate members and pipe laying and tensioning arrangement are so shaped and configured that the pipe laying and tensioning arrangement can hold and lower the sealine by holding a buoyant elongate member at the end of the sealine, and the maximum load bearing capacity of the winch is substantially less than the maximum load bearing capacity of the pipe laying and tensioning arrangement.

43. A pipe laying vessel including a pipe laying and tensioning arrangement for withstanding the tension exerted by a pipeline during laying of the pipeline and an A/R system according to any one of claims 30 to 33.

44. A disconnection system for disconnecting a winch line from a pipeline, the system comprising: a first part of a connector, the first part being connectable to a pipeline; and a second part of the connector, the second part being connectable to a winch line; the first and second parts being able to be connected and locked together by a locking mechanism and being able to be unlocked when underwater by remote actuation of the locking mechanism, wherein the system is so arranged that upon unlocking, the first part of the connector remains attached to the pipeline and the second part of the connector attached to the winch line.

45. A method of abandoning a pipeline being laid by a vessel, wherein a sealine comprising the pipeline is initially held by a pipe laying and tensioning arrangement, the tension at sea level of the sealine being at a first level, the method including the steps of:

(i) reducing the tension at sea level of the sealine, (ii) thereafter holding the sealine with the pipe laying and tensioning arrangement with the tension at sea level of the sealine being at a second level substantially lower than the first level, and (iii) thereafter lowering the end of the sealine towards the seabed using a line from a winch on the vessel, whereby the maximum load bearing capacity of the winch is able to be substantially less than the maximum load bearing capacity of the pipe laying and tensioning arrangement.

\* \* \* \* \*

UNITED STATES PATENT AND TRADEMARK OFFICE
CERTIFICATE OF CORRECTION

PATENT NO. : 6,729,802 B2  
DATED : May 4, 2004  
INVENTOR(S) : Umberto Giovannini et al.

It is certified that error appears in the above-identified patent and that said Letters Patent is hereby corrected as shown below:

<u>Title page,</u>  
Item [86], PCT No., change "PCT/EP01/13095" to -- PCT/EP00/13095 --.

Signed and Sealed this

Twelfth Day of October, 2004

JON W. DUDAS  
*Director of the United States Patent and Trademark Office*